United States Patent
Surnilla et al.

(10) Patent No.: US 8,733,320 B2
(45) Date of Patent: May 27, 2014

(54) COMBUSTION STABILITY ENHANCEMENT VIA INTERNAL EGR CONTROL

(75) Inventors: Gopichandra Surnilla, West Bloomfield, MI (US); Michael Howard Shelby, Plymouth, MI (US); Joseph Norman Ulrey, Dearborn, MI (US); Daniel Joseph Styles, Canton, MI (US); Christopher House, Belleville, MI (US); Brad Alan Boyer, Canton, MI (US); James Hilditch, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 714 days.

(21) Appl. No.: 13/044,373

(22) Filed: Mar. 9, 2011

(65) Prior Publication Data

US 2011/0239997 A1    Oct. 6, 2011

Related U.S. Application Data

(63) Continuation-in-part of application No. 12/753,716, filed on Apr. 2, 2010, now Pat. No. 7,934,486.

(51) Int. Cl.
*F02B 37/12* (2006.01)
*F02M 25/07* (2006.01)

(52) U.S. Cl.
USPC .................. 123/406.23; 123/568.21

(58) Field of Classification Search
USPC ............ 123/406.23, 568.11, 568.12, 568.18, 123/568.19, 568.21, 561, 559.1; 60/600–603, 605.2, 611, 612
See application file for complete search history.

(56) References Cited

U.S. PATENT DOCUMENTS

| | | | |
|---|---|---|---|
| 4,424,675 A | 1/1984 | Ojima | |
| 4,849,897 A | 7/1989 | Ciccarone | |
| 6,062,026 A | 5/2000 | Woollenweber et al. | |
| 6,470,682 B2 | 10/2002 | Gray, Jr. | |
| 6,729,301 B2 | 5/2004 | Nakamori et al. | |
| 6,748,936 B2 | 6/2004 | Kinomura et al. | |
| 7,093,590 B2 | 8/2006 | Shimazaki et al. | |
| 7,934,486 B1 * | 5/2011 | Styles et al. | 123/406.23 |
| 8,250,865 B2 * | 8/2012 | Pearson | 123/568.12 |
| 2008/0223038 A1 | 9/2008 | Lutz et al. | |
| 2010/0115945 A1 | 5/2010 | Nakatani | |
| 2010/0121557 A1 | 5/2010 | Canino et al. | |

FOREIGN PATENT DOCUMENTS

WO    2007/136142 A1    11/2007
WO    2008/152491 A1    12/2008

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

A method for controlling combustion in a cylinder of a turbocharged engine in which intake air is reserved upstream of the cylinder. The method comprises decreasing an internal EGR rate in the cylinder during a tip-out condition if the temperature of the intake air is above a threshold, and increasing the internal EGR rate in the cylinder during a tip-out condition if the temperature of the intake air is below the threshold.

20 Claims, 5 Drawing Sheets

COMBUSTION STABILITY ENHANCEMENT VIA INTERNAL EGR CONTROL

CROSS REFERENCE TO RELATED APPLICATIONS

This application is a continuation-in-part of U.S. patent application Ser. No. 12/753,716, filed Apr. 2, 2010 and entitled INTERNAL AND EXTERNAL LP EGR FOR BOOSTED ENGINES, the entirety of which is hereby incorporated by reference herein for all purposes.

TECHNICAL FIELD

This application relates to the field of motor-vehicle engineering, and more particularly, to air induction and exhaust-gas recirculation in motor vehicle engine systems.

BACKGROUND AND SUMMARY

A boosted engine may exhibit higher combustion and exhaust temperatures than a naturally aspirated engine of similar output power. Such higher temperatures may cause increased nitrogen-oxide ($NO_x$) emissions from the engine and may accelerate materials ageing, including turbocharger and exhaust-aftertreatment catalyst ageing. Exhaust-gas recirculation (EGR) is one approach for combating these effects. EGR works by diluting the intake air charge with exhaust gas, thereby reducing its oxygen content. When diluted air is used in place of ordinary air to support combustion in the engine, lower combustion and exhaust temperatures result.

EGR can also improve fuel economy in gasoline engines. At medium and high loads, fuel economy is improved due to knock mitigation, allowing for more efficient combustion phasing, reduced heat loss to the engine coolant, and lower exhaust temperatures—which in turn reduce the need for enrichment to cool the exhaust components. At low loads, EGR provides an additional benefit of reducing throttling losses.

In suitably configured engine systems, so-called 'internal EGR' may be used to achieve at least some of the advantages noted above. In this approach, combustion in one or more cylinders of the engine may be initiated when exhaust from a previous combustion is still present in the cylinders. The amount of internal EGR may be controlled using variable intake- and/or exhaust-valve timing.

To provide a higher level of intake-air dilution, 'external EGR' may be used instead of, or in addition to internal EGR. In this approach, exhaust gas discharged from the cylinder is routed back to the intake, where it mixes with fresh air. In boosted engine systems equipped with a compressor coupled to an exhaust-driven turbine, exhaust gas may be recirculated through a high pressure (HP) EGR loop and/or a low-pressure (LP) EGR loop. In the HP EGR loop, the exhaust gas is taken from upstream of the turbine and is mixed with intake air downstream of the compressor. In an LP EGR loop, the exhaust gas is taken from downstream of the turbine and is mixed with intake air upstream of the compressor.

HP and LP EGR strategies achieve optimum efficacy in different regions of the engine load-speed map. Moreover, each strategy presents its own control-system challenges. For example, HP EGR is most effective at low loads, where intake vacuum provides ample flow potential; at higher loads, the desired EGR flow rate may be unattainable due to reduced flow potential. Intrinsically dependent on turbocharger waste gate and throttle conditions, HP EGR may require a complex flow-control strategy. Further, HP EGR may suffer from poor EGR/intake-air mixing and may require a high rate of active cooling due the short length between the HP EGR take-off point and the intake runners of the engine.

In contrast to HP EGR, LP EGR provides adequate flow from mid to high engine loads (areas where HP EGR may be flow limited), is more easily cooled, and can be controlled more independently of the throttle and waste gate. However, LP EGR may respond sluggishly to changing engine load, engine speed, or intake air flow. In gasoline engines especially, such unsatisfactory transient response may result in combustion instability during tip-out conditions, when fresh air is needed to sustain combustion but EGR-diluted air is present upstream of the throttle valve. Moreover, a significant lag in EGR availability can occur during tip-in conditions, as the amount of EGR accumulated in the intake manifold may not be sufficient to provide the desired combustion and/or emissions-control performance.

Turbocharged engine systems using more than one EGR mode have been described. For example, World Intellectual Property Organization Patent Application Publication Number 2007/136142 describes a system wherein a ratio of internal and external LP EGR is adjusted depending on engine operating conditions. However, this reference does not contemplate the full range of control options that are possible when fast-responding internal EGR is coordinated with slower-responding external LP EGR.

Therefore, one embodiment provides a method for controlling combustion in a cylinder of a turbocharged engine in which intake air is reserved upstream of the cylinder. The method comprises decreasing an internal EGR rate in the cylinder during a tip-out condition if the temperature of the intake air is above a threshold, and increasing the internal EGR rate in the cylinder during a tip-out condition if the temperature of the intake air is below the threshold. By applying divergent strategies to enhance combustion stability during tip out, depending on the intake-air temperature, various benefits are realized. Such benefits may include extending the steady-state operating range over which cooled LP EGR may be used, while protecting combustion stability during transients.

The summary above is provided to introduce a selected part of this disclosure in simplified form, not to identify key or essential features. The claimed subject matter, defined by the claims, is limited neither to the content of this summary nor to implementations that address problems or disadvantages noted herein.

DETAILED DESCRIPTION

Figure 1:
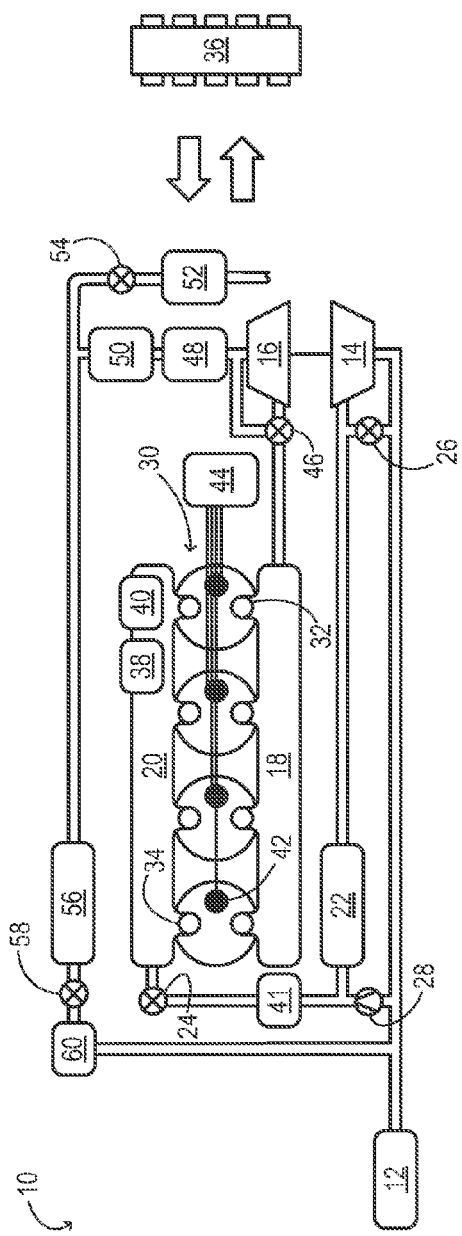
FIGS. 1 and 2 schematically shows aspects of example engine systems in accordance with different embodiments of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 schematically shows aspects of an example engine system 10 in one embodiment. In engine system 10, fresh air is inducted into air cleaner 12 and flows to compressor 14. The compressor may be any suitable intake-air compressor—a motor-driven or driveshaft driven supercharger compressor, for example. In engine system 10, however, the compressor is a turbocharger compressor mechanically coupled to turbine 16, the turbine driven by expanding engine exhaust from exhaust manifold 18. In one embodiment, the compressor and turbine may be coupled within a twin scroll turbocharger. In another embodiment, the turbocharger may be a variable geometry turbocharger (VGT), in which turbine geometry is actively varied as a function of engine speed.

In engine system 10, compressor 14 is coupled fluidically to intake manifold 20 via charge-air cooler 22 and throttle valve 24. Accordingly, pressurized air from the compressor flows through the charge-air cooler and the throttle valve en route to the intake manifold. The charge-air cooler may be any suitable heat exchanger configured to cool the intake air charge for desired combustion and emissions-control performance. As shown in FIG. 1, compressor by-pass valve 26 is coupled between the inlet and the outlet of the compressor. The compressor by-pass valve may be a normally closed valve configured to open at the command of an electronic control system (vide infra) in order to relieve excess boost pressure under selected operating conditions. For example, the compressor by-pass valve may be opened during conditions of decreasing engine speed to avert compressor surge. When the compressor by-pass valve is opened, uncompressed, fresh air may flow to throttle valve 24 through check valve 28. Check valve 28 enables fresh air bypass of most of the EGR-diluted air charge upstream of the throttle valve. This feature may reduce the impact of residual EGR-diluted air in the engine system during tip out.

In engine system 10, exhaust manifold 18 and intake manifold 20 are coupled to a series of cylinders 30 through a series of exhaust valves 32 and intake valves 34, respectively. In one embodiment, each of the exhaust and intake valves may be electronically actuated. In another embodiment, each of the exhaust and intake valves may be cam actuated. Whether electronically actuated or cam actuated, the timing of exhaust and intake valve opening and closure may be adjusted as needed for desired combustion and emissions-control performance.

In particular, the valve timing may be adjusted so that combustion is initiated when a controlled amount of exhaust from a previous combustion is still present in one or more cylinders. Such exhaust gas may be retained in a cylinder (e.g., not expelled or not fully expelled from the cylinder during the exhaust stroke), or in the alternative, readmitted to the cylinder from the exhaust manifold during the intake stroke, via a still open exhaust valve. For example, as the closing timing of the exhaust valve is moved away from top dead center (TDC) of the exhaust stroke, increased amounts of exhaust gas may be retained, depending on parameters such as engine speed, engine load, etc. Specifically, early exhaust valve closing (before TDC of the exhaust stroke) may be used to limit the expulsion of exhaust gasses and increase residual exhaust gasses retained for the next combustion event in a particular cylinder. In another example, late exhaust valve closing (e.g., closure of the exhaust valve during the intake stroke of a subsequent cylinder cycle) may increase exhaust gases drawn in from the exhaust manifold to the cylinder during the intake stroke, again increasing intake-air dilution. In this way, valve adjustments can affect the level of dilution in the very next combustion event in that cylinder.

Intake-air dilution enacted in this manner may increase the air-charge temperature in the cylinder in which it is provided. Nevertheless, the peak combustion temperature in the cylinder, relevant to $NO_x$ control, exhaust-system ageing, etc.—may be decreased. Accordingly, adjusted valve timing may enable an 'internal EGR' mode useful for diluting the intake air charge under selected operating conditions. In some embodiments, it may be used in addition to one or more 'external EGR' modes to be described hereinafter.

FIG. 1 shows electronic control system 36, which may be an electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a cylinder at a time of ignition. To assess operating conditions in connection with the control functions of the engine system, the electronic control system may be operatively coupled to a plurality of sensors arranged throughout the engine system—flow sensors, temperature sensors, pedal-position sensors, pressure sensors, etc. In FIG. 1, for example, manifold air-pressure (MAP) sensor 38 and manifold air-temperature sensor (MAT) 40 are shown coupled to intake manifold 20; mass air-flow (MAF) sensor 41 is coupled upstream of throttle valve 24. Various other sensors may be provided as well, in this and other embodiments.

Cylinders 30 may be supplied one or more of a variety of fuels: gasoline, alcohols, diesel, biodiesel, compressed natural gas, etc. Fuel may be supplied to the cylinders via direct injection, port injection, throttle-body injection, or any combination thereof. In engine system 10, combustion is initiated via spark ignition. Accordingly, the engine system includes a series of spark plugs 42 configured to receive timed voltage pulses from electronic ignition system 44. In other embodiments, combustion may be initiated via spark ignition and/or compression ignition in any variant.

As noted above, exhaust from exhaust manifold 18 flows to turbine 16 to drive the turbine. When reduced turbine torque is desired, some exhaust may be directed instead through waste gate 46, by-passing the turbine. The combined flow from the turbine and the waste gate then flows through exhaust-aftertreatment devices 48 and 50. The nature, number, and arrangement of the exhaust-aftertreatment devices may differ in the different embodiments of this disclosure. In general, the exhaust-aftertreatment devices may include at least one exhaust-aftertreatment catalyst configured to catalytically treat the exhaust flow, and thereby reduce an amount of one or more substances in the exhaust flow. For example, one exhaust-aftertreatment catalyst may be configured to trap $NO_x$ from the exhaust flow when the exhaust flow is lean, and to reduce the trapped $NO_x$ when the exhaust flow is rich. In other examples, an exhaust-aftertreatment catalyst may be configured to disproportionate $NO_x$ or to selectively reduce $NO_x$ with the aid of a reducing agent. In still other examples, an exhaust-aftertreatment catalyst may be configured to oxidize residual hydrocarbons and/or carbon monoxide in the exhaust flow. Different exhaust-aftertreatment catalysts having any such functionality may be arranged in wash coats or elsewhere in the exhaust-aftertreatment devices, either separately or together. In some embodiments, the exhaust-aftertreatment devices may include a regenerable soot filter configured to trap and oxidize soot particles in the exhaust flow.

Continuing in FIG. 1, all or part of the treated exhaust from the exhaust aftertreatment devices may be released into the ambient via silencer 52. In engine system 10, the treated exhaust flows to the silencer via exhaust back-pressure valve 54. The exhaust back-pressure valve may be kept fully open under normal operating conditions, but commanded to partially close at low engine loads, as further described hereinafter.

Depending on operating conditions, some treated exhaust may be diverted through EGR cooler 56. The exhaust may be diverted by opening an EGR valve 58 coupled in series with the EGR cooler, for example. The EGR cooler may be any suitable heat exchanger configured to cool the exhaust flow to temperatures suitable for mixing into the intake air charge. In this manner, some exhaust may be delivered to the intake manifold via a cooled conduit coupled downstream of the turbine and upstream of the compressor. From EGR cooler 56, the cooled exhaust gas flows to EGR valve 58; from the EGR valve, it flows through EGR flow sensor 60 en route to compressor 14. The rotation of the compressor, in addition to the relatively long LP EGR flow path in engine system 10, provides excellent homogenization of the exhaust gas into the intake air charge. Further, the disposition of EGR take-off and mixing points provides very effective cooling of the exhaust gas; as shown in FIG. 1, the recirculated exhaust traverses exhaust-aftertreatment devices 48 and 50, EGR cooler 56, as well as charge-air cooler 22.

In some embodiments, throttle valve 24, compressor bypass valve 26, waste gate 46, exhaust back-pressure valve 54, and/or EGR valve 58 may be electronically controlled valves configured to close and open at the command of electronic control system 36. Further, one or more of these valves may be continuously adjustable. The electronic control system may be operatively coupled to each of the electronically controlled valves and configured to command their opening, closure, and/or adjustment as needed to enact any of the control functions described herein. To monitor the external EGR flow and enable additional control based on the external EGR flow, engine system 10 includes EGR flow sensor 60. The EGR flow sensor may be operatively coupled to the electronic control system and configured to provide an output responsive to the external EGR flow. In one embodiment, the electronic control system may be configured to adjust the EGR valve at a first, lower rate and the variable valve timing (vide supra) at a second, higher rate to provide a desired exhaust-gas recirculation rate to the cylinder prior to the ignition. The first and second rates may differ in this manner because of the naturally lower response bandwidth for changes in LP EGR flow rate relative to the internal EGR rate. The lower response bandwidth is due to the comparatively great amount of exhaust residing between the LP EGR take-off point and the LP EGR injection point during typical operating conditions.

In one embodiment, EGR valve 58 may not be a continuously adjustable valve, but a simpler, two-state shut-off valve. Specifically, the EGR valve may admit of two states—a more open state and less open state. The less open state of the EGR valve may be substantially closed but configured to leak a low flow of EGR under strong pressurization. The more open state of the EGR valve may be configured to provide relatively little flow restriction, such that the external EGR flow responds naturally to changing flow potential from the EGR take-off point to the EGR mixing point. For ease of description, the more open state is referred to hereinafter as 'open', and the less open state is referred to hereinafter as 'closed'; these terms will be understood in the non-limiting context defined above.

By appropriately controlling EGR valve 58, and by adjusting the exhaust and/or intake valve timing, electronic control system 36 may enable engine system 10 to deliver intake air to cylinders 30 under varying operating conditions. These include conditions where EGR is omitted from the intake air or is provided internal to each cylinder (via adjusted valve timing, for example), conditions where EGR is drawn from an LP take-off point downstream of turbine 16 and provided to an LP mixing point upstream of compressor 14, and conditions where both of these strategies are applied in concert.

Accordingly, when EGR valve 58 is open, EGR will flow during conditions of medium and high engine load in response to the pressure gradient between take-off and mixing points. As the engine load increases and internal EGR is phased out, the pressure gradient between these points increases also, naturally driving the external EGR flow. As the engine load decreases, the pressure gradient also decreases, so the external EGR flow is naturally reduced as internal EGR is phased in. At very low engine loads approaching idle, the EGR valve may be closed to discourage external EGR flow. The EGR valve may be closed also during peak-power operation. However, by providing a small leak in the valve, a small flow of external EGR can be delivered at peak power, driven by the large pressure gradient across the valve. Such external EGR flow may advantageously reduce enrichment and maintain peak power requirements. Thus, even a simple shut-off valve may enable the external EGR flow to be controlled in a manner that naturally tracks engine load in low-to-high load regions. This simple configuration also eliminates much of the control complexity required to actuate a fully proportional EGR valve. In this manner, the intake air reserved in intake manifold 20, upstream of cylinders 30, may be diluted to an appropriate level for steady-state operation over a wide range of engine speed and load.

Further, exhaust-back pressure valve 54 may be partially closed to maintain adequate flow potential in the external EGR loop. When the exhaust back-pressure valve is partially closed, exhaust pressure builds at the LP EGR take-off point, thereby increasing the external EGR flow potential. Partially closing the exhaust back-pressure valve may also increase the internal EGR rate by increasing the exhaust pressure in exhaust manifold 18.

Figure 2:
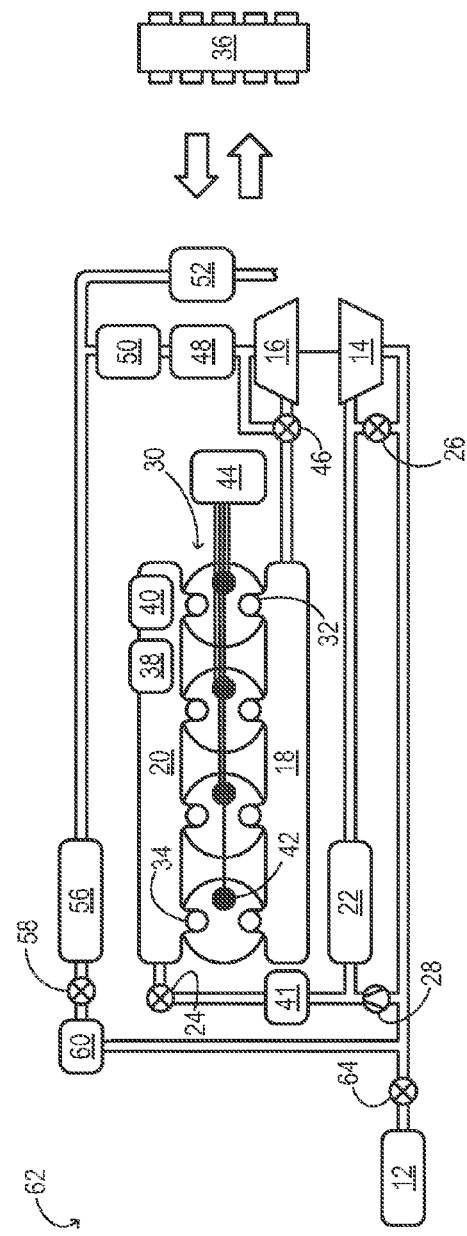

FIG. 2 schematically shows aspects of another example engine system 62 in one embodiment. Engine system 62 lacks exhaust backpressure valve 54, but includes clean-air throttle valve 64 coupled downstream of air cleaner 12. The clean-air throttle valve may be an electronically controlled valve operatively coupled to electronic control system 36. The clean-air throttle valve may be kept fully open under normal operating conditions, but partially closed at low engine loads to maintain adequate flow potential in the external EGR loop. When the clean-air throttle valve is partially closed, a partial vacuum develops downstream of the clean-air throttle valve, thereby increasing the external EGR flow potential. In other embodiments fully consistent with this disclosure, the engine system may include both an exhaust back-pressure valve and a clean-air throttle valve. In still other embodiments, the engine system may include neither.

Figure 3:
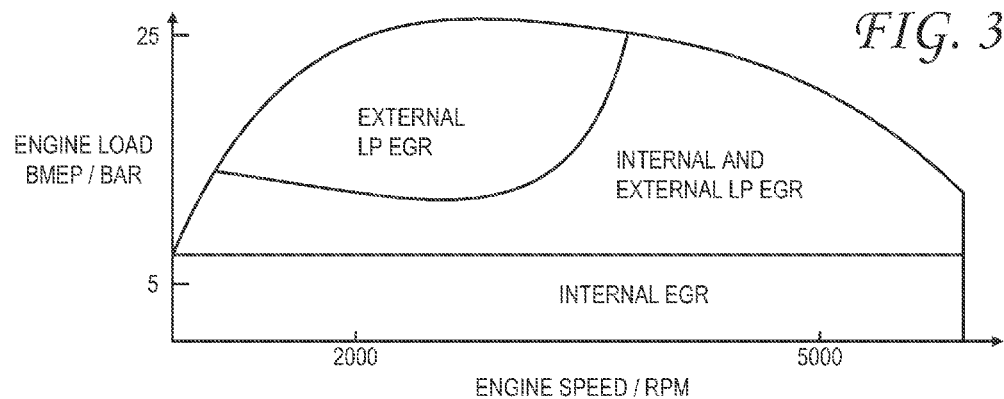
FIG. 3 shows an idealized map of engine load versus engine speed for an example turbocharged engine in accordance with an embodiment of this disclosure.

FIG. 3 shows an idealized map of engine load versus engine speed for an example turbocharged gasoline engine in one embodiment. The map is divided into three regions based on how EGR is supplied to the engine: a low-load region where internal EGR but no external EGR is supplied, a mid-load region where a controlled mixture of internal and external EGR is supplied, and a high-load region where external LP EGR but no internal EGR is supplied. Hereinafter, various control features for governing EGR supply according to such a map are described by example. It will be understood, however, that the control features here described are equally compatible with other engine maps, including those in which the external EGR includes some amount of HP EGR—e.g., exhaust drawn from an HP take-off point upstream of a turbine and delivered to an HP injection point downstream of a compressor. In such embodiments, the mid-load region illustrated in FIG. 3 may include a low-speed region and a high-speed region. In the low-speed region, a controlled mixture of internal and external HP EGR may be supplied. And in the high-speed region, external HP EGR but no internal EGR may be supplied. In still other embodiments, the high-load region where external LP EGR but no internal EGR is supplied may be omitted from the map.

Figure 4:
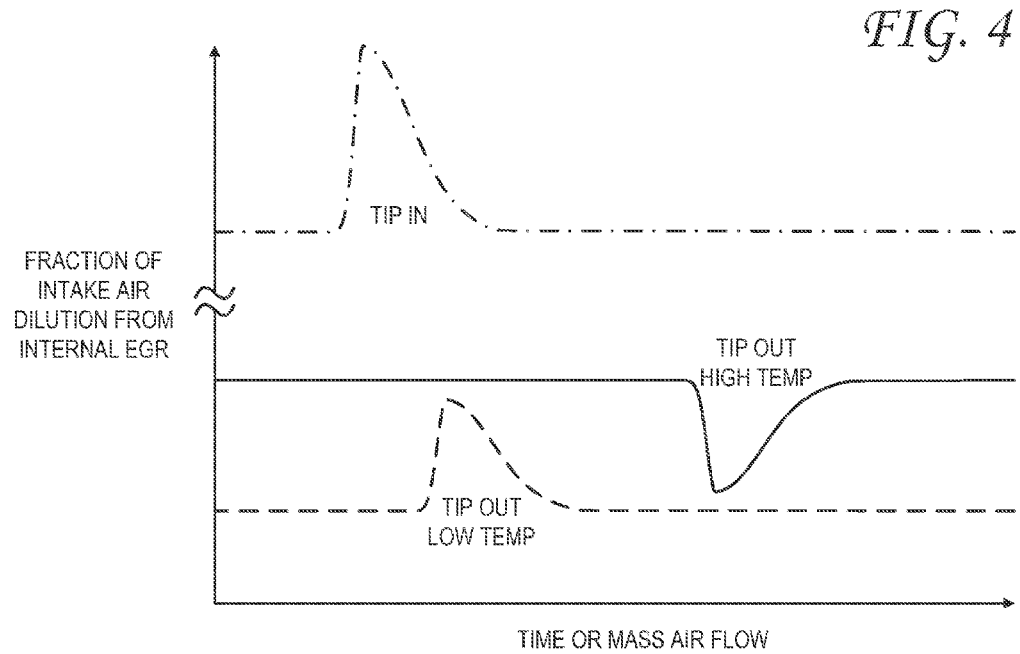
FIG. 4 shows an idealized graph of internal EGR rate versus time in an example scenario in accordance with an embodiment of this disclosure.

FIG. 4 graphically represents one strategy for enhancing combustion stability in an engine system. In this graph, the value plotted on the vertical axis is the fraction of the overall air-charge dilution supplied by internal EGR—e.g., the internal EGR rate divided by internal plus external EGR rates. The graph includes: a solid line, which shows a tip-out transient occurring at relatively high intake-air temperatures; a dashed line, which shows a tip-out transient occurring at relatively low intake-air temperatures; and a dot-dashed line, which shows a tip-in transient.

The tip-in transient shown in FIG. 4 interrupts a period of relatively low steady-state engine speed and load. Accordingly, the fraction of the overall air-charge dilution supplied by internal EGR is relatively high prior to the transient, and returns to a relatively high level after the transient. This is consistent with the graph of FIG. 3, wherein the predominate EGR mode used at low speed and load is internal EGR. During the tip-in transient, when the LP EGR path is opened up, the internal-EGR fraction increases further, to compensate for the delivery lag in the LP EGR path. This furnishes the required amount of diluent for $NO_x$ control at high load, high-speed conditions.

Both of the tip-out transients shown in FIG. 4 interrupt periods of relatively high steady-state engine speed and load. Accordingly, the fraction of the overall air-charge dilution supplied by internal EGR is relatively low prior to the transients, and returns to a relatively low level after the transients. This is consistent with the graph of FIG. 3, wherein a significant amount of external LP EGR is used at higher engine speeds and loads.

Continuing in FIG. 4, the response of the engine system to tip-out transients is dependent on the air-charge temperature. If the air-charge temperature is relatively high (e.g., above a threshold), then the internal-EGR fraction is lowered further during the transient. This action helps to compensate for the lag in depleting diluent from the intake after closure of the EGR valve, thereby avoiding a precipitous drop in air-charge oxygen content that could result in combustion instability.

The inventors herein have observed, however, that under certain conditions, combustion stability during tip-out may be protected even without suppressing the diluent level in the air charge. On the contrary, an increase in dilution may improve combustion stability during tip out if accompanied by an increase in air-charge temperature, as effected by a transient increase in the internal EGR rate. Accordingly, referring again to FIG. 4, if the air-charge temperature is relatively low (e.g., below a threshold), then the internal-EGR fraction may be increased during the transient. This action may rapidly increase air-charge temperature, thereby enhancing combustion stability.

In view of these divergent responses to tip-out transients, depending on intake-air temperature, the internal-EGR fractions used before and after the transients (i.e., at steady-state) may also depend on the intake-air temperature, as shown in FIG. 4. In particular, a greater internal-EGR fraction may be used at relatively high air-charge temperatures, and a lesser internal-EGR fraction may be used at relatively low air-charge temperatures. Such temperature dependence offers at least two advantages. First, it maximizes the range of authority of the internal EGR rate over the air-charge dilution level during high-temperature conditions, when such authority is useful for enhancing tip-out combustion stability. Second, it maximizes the range of authority of the internal EGR rate over the air-charge temperature during low-temperature conditions, where such authority is useful for enhancing tip-out combustion stability. Third, it enables the internal-EGR fraction to be maintained at an attractively low level as long as the manifold air temperature remains low. As a result, the level of cooled LP EGR can be maintained at a higher value, effectively extending the $NO_x$-mitigation and fuel-efficiency benefits of cooled LP EGR over a larger portion of the load-speed map.

For ease of illustration, the graphs of FIG. 4 represent simple tip-in and tip-out transients, in which the engine returns, after each transient, to the same load and speed values from before the transient. Accordingly, the internal-EGR fraction is indicated to be the same before and after each transient. However, the illustrated scenarios are not intended to be limiting in any sense. In general, a tip-in or tip-out transient may transition the engine from one steady-state load and speed to another. As the steady-state internal-EGR fraction may depend on speed and load, such transitioning may effect a net change in the steady-state internal-EGR fraction. In other words, each graph may land up, after the transient, at different level or with different slope than before the transient.

The configurations described above enable various methods for controlling combustion in a cylinder of a boosted engine. Accordingly, some such methods are now described, by way of example, with continued reference to the above configurations. It will be understood, however, that the methods here described, and others fully within the scope of this disclosure, may be enabled by other configurations as well. Naturally, each execution of a method may change the entry conditions for a subsequent execution and thereby invoke a complex decision-making logic. Such logic is fully contemplated in this disclosure. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

The methods presented herein include various measuring and/or sensing events enacted via one or more sensors disposed in the engine system. The methods also include various computation, comparison, and decision-making events, which may be enacted in electronic control system 36, operatively coupled to the sensors. The methods further include various hardware-actuating events, which the electronic control system may command selectively, pursuant to the decision-making events. These methods may entail one or more different processing strategies, such as event-driven, interrupt-driven, multi-tasking, multi-threading, and the like. As such, the disclosed process steps (operations, functions, and/or acts) may correspond to code to be programmed into computer readable storage medium in the electronic control system.

Figure 5:
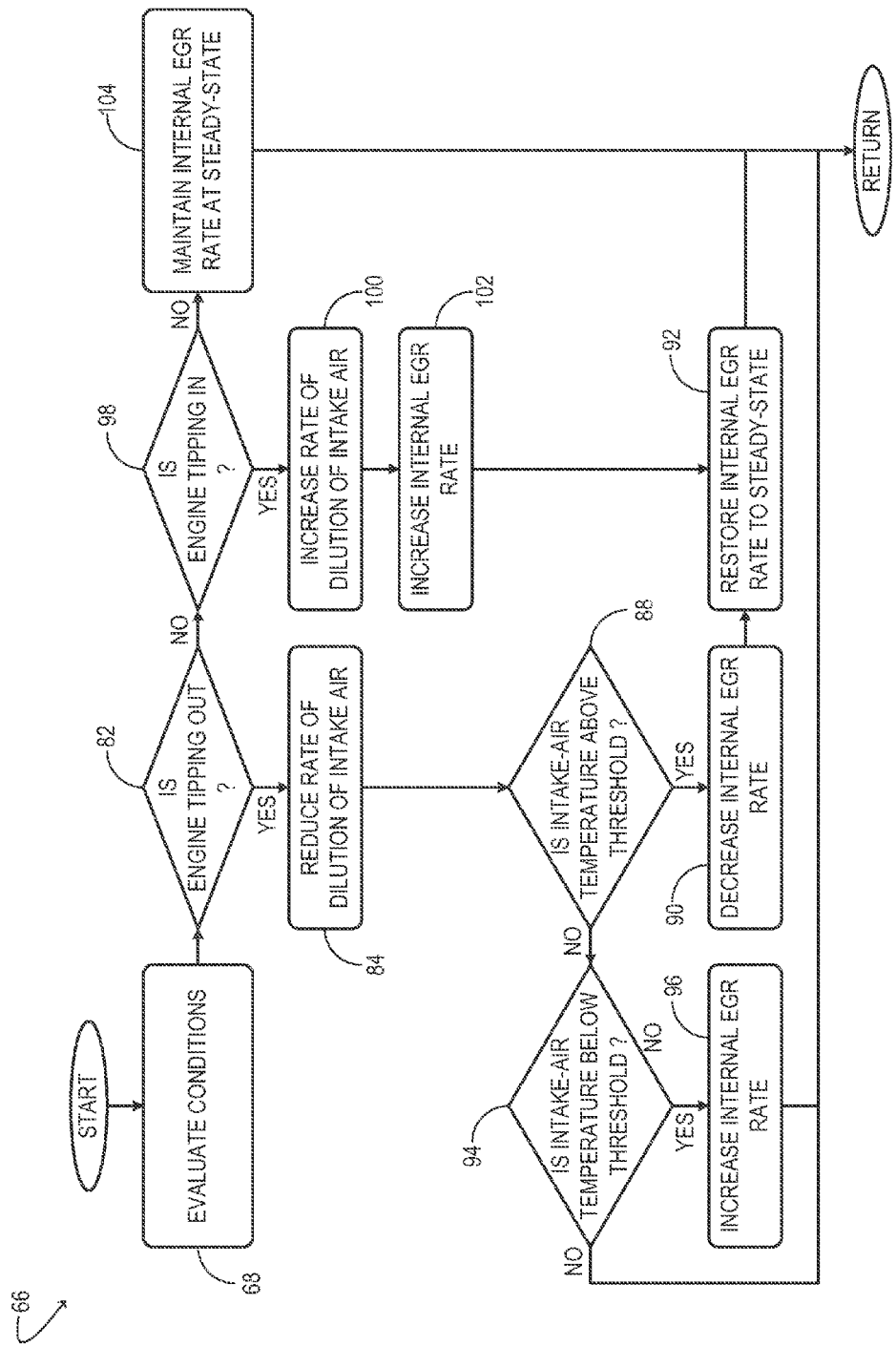
FIG. 5 illustrates an example method for controlling combustion in a cylinder of a turbocharged engine in accordance with an embodiment of this disclosure.
Figure 6:
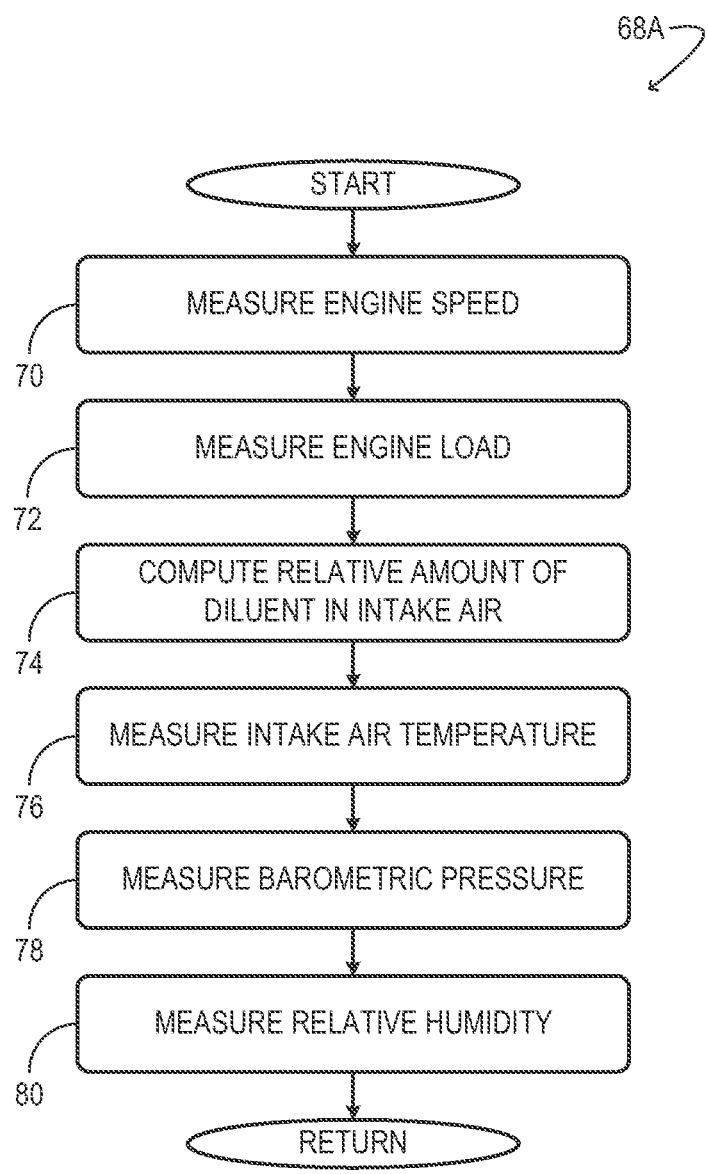
FIG. 6 illustrates an example method for evaluating engine-system operating conditions in accordance with an embodiment of this disclosure.

FIG. 5 illustrates an example method 66 for controlling combustion in a cylinder of a boosted engine. The method begins at 68, where various operating conditions of the engine system are evaluated. FIG. 6 illustrates an example method 68A for evaluating such operating conditions. At 70 of method 68A, the engine speed is measured, and at 72, the engine load is measured. The engine speed and load may be measured directly, using sensors responsive to crankshaft velocity and torque, respectively, or measured indirectly via surrogate sensor data. For example, a mass air flow sensor coupled to intake manifold 20 may provide an output responsive to engine speed, while manifold air-pressure sensor 38 may provide an output responsive to engine load. In some embodiments, measurement of engine speed and load may be repeated during engine operation with such frequency as to enable the rate of change of these parameters to be computed in electronic control system 36. Accordingly, tip out may be recognized by the electronic control system as a condition of abruptly decreasing engine speed or load. Conversely, tip in may be recognized as a condition of abruptly increasing engine speed or load.

At 74 the relative amount of diluent in the intake air supplied to the cylinders of the engine is computed. Electronic control system 36 may compute the relative amount based on a time-resolved, accumulated history of relevant operating conditions of the engine system. Such conditions may include mass air flow into intake manifold 20, the manifold air pressure, the state of EGR valve 58, the output of an oxygen or air/fuel sensor coupled in the exhaust, etc.

At 76 an intake-air temperature in the engine system is measured. The different embodiments of this disclosure may differ with respect to the particular intake-air temperature measured at this point. In one embodiment, the measured intake-air temperature may be a manifold air temperature from MAT sensor 40. In other embodiments, the intake-air temperature may be an engine-coolant temperature or an ambient-air temperature. In still other embodiments, the intake-air temperature may be estimated at a desired locus—e.g., the intake manifold—based on a temperature measured at a different locus—e.g., at air cleaner 12—in view of various operating conditions of the engine system. At 78 the barometric pressure is measured, and at 80 the relative humidity is measured, either directly or indirectly, via one or more sensors operatively coupled to electronic control system 36. From 80 the method returns.

Returning now to FIG. 5, method 66 advances from 68 to 82, where it is determined whether the engine is tipping out. Tip out may be signaled by an abrupt decrease in the measured engine speed or load. If the engine is tipping out, then the method advances to 84. At 84 the rate of dilution of the intake air is reduced. In the various embodiments contemplated herein, reducing and increasing the rate of dilution of the intake air may comprise actuating EGR valve 58, exhaust back-pressure valve 54, and/or clean-air throttle 64. In this manner, the flow rate of exhaust from the LP take-off point in the exhaust system, through EGR cooler 56, and to the LP mixing point upstream of compressor 14 may be actively controlled. At 88 it is determined whether the intake-air temperature is above a predetermined threshold. If the intake-air temperature is above the threshold, then the method advances to 90, where the internal EGR rate is decreased. In one embodiment, the internal EGR rate may be decreased rapidly, to track a correspondingly rapid decrease in the air-charge dilution level required for combustion stability. In one embodiment, decreasing the internal EGR rate at 90, and increasing the internal EGR rate elsewhere in the method, may comprise altering a variable cam phasing applied to one or more of an intake valve and an exhaust valve of the cylinder.

At 92 the internal EGR rate is restored to the appropriate steady-state value for post-transient engine speed and load. In particular, the internal EGR rate may be restored in a manner that tracks and complements the decreasing dilution of the intake air caused by the reduction in the rate of dilution of the intake air—e.g., closure of EGR valve 58. In this manner, the net level of dilution of the air charge in the cylinder may reliably track the target dilution as the engine returns to steady-state. After 92 method 66 returns.

Returning now to 88, if the intake-air temperature is not above the threshold, then the method advances to 94. At 94 it is determined whether the intake-air temperature is below another predetermined threshold, which may be the same or different than the threshold referred to above. If the intake-air temperature is below this threshold, then the method advances to 96, where the internal EGR rate is increased. In one embodiment, the internal EGR rate may be increased rapidly, to track a correspondingly rapid reduction in manifold air pressure that threatens combustion stability at current air-charge temperatures. Due to the increase in air-charge temperature caused by the increased internal EGR, combustion stability may be preserved through the tip-out transient, despite the reduced manifold air pressure and despite the greater-than-optimal level of dilution of the air charge. If the intake-air temperature is not below this threshold, then the method returns.

Returning now to 82, if it is determined that the engine is not tipping out, then the method advances to 98. At 98 it is determined whether the engine is tipping in. Tip in may be signaled by an abrupt increase in the measured engine speed or load. If the engine is tipping in, then the method advances to 100, where the rate of dilution of the intake air is increased, such as by opening or further opening EGR valve 58. At 102 the internal EGR rate is increased in the manner described above. From 102, the method returns to 92, where the internal EGR rate is restored to the steady-state value in a manner that tracks and complements the increasing dilution of the intake air caused by the increase in the rate of dilution of the intake air. In this manner, the net level of dilution of the air charge in the cylinder may reliably track the target dilution as the engine returns to steady-state. From 92, method 66 returns.

Returning now to 98, if it is determined that the engine is not tipping in, then the method advances to 104. At 104 the internal EGR rate is maintained at a steady-state value. The steady-state internal EGR rate may differ for different operating conditions of the engine system. Accordingly, the steady-state internal EGR rate may supply a greater fraction of the total rate of diluent delivery to the cylinder if the engine is operating in a lower load-speed region, and a lesser fraction of the total rate of diluent delivery to the cylinder if the engine is operating in a higher load-speed region, as shown in FIG. 4.

In one embodiment, the steady-state internal EGR rate may be maintained at a higher level if the temperature of the intake air is above the threshold, and at a lower level if the temperature of the intake air is below the threshold, as shown in FIG. 5. This approach preserves the range of authority of the internal EGR rate over the air-charge temperature and dilution level during transient tip-out conditions. After 104, method 66 returns.

Figure 7:
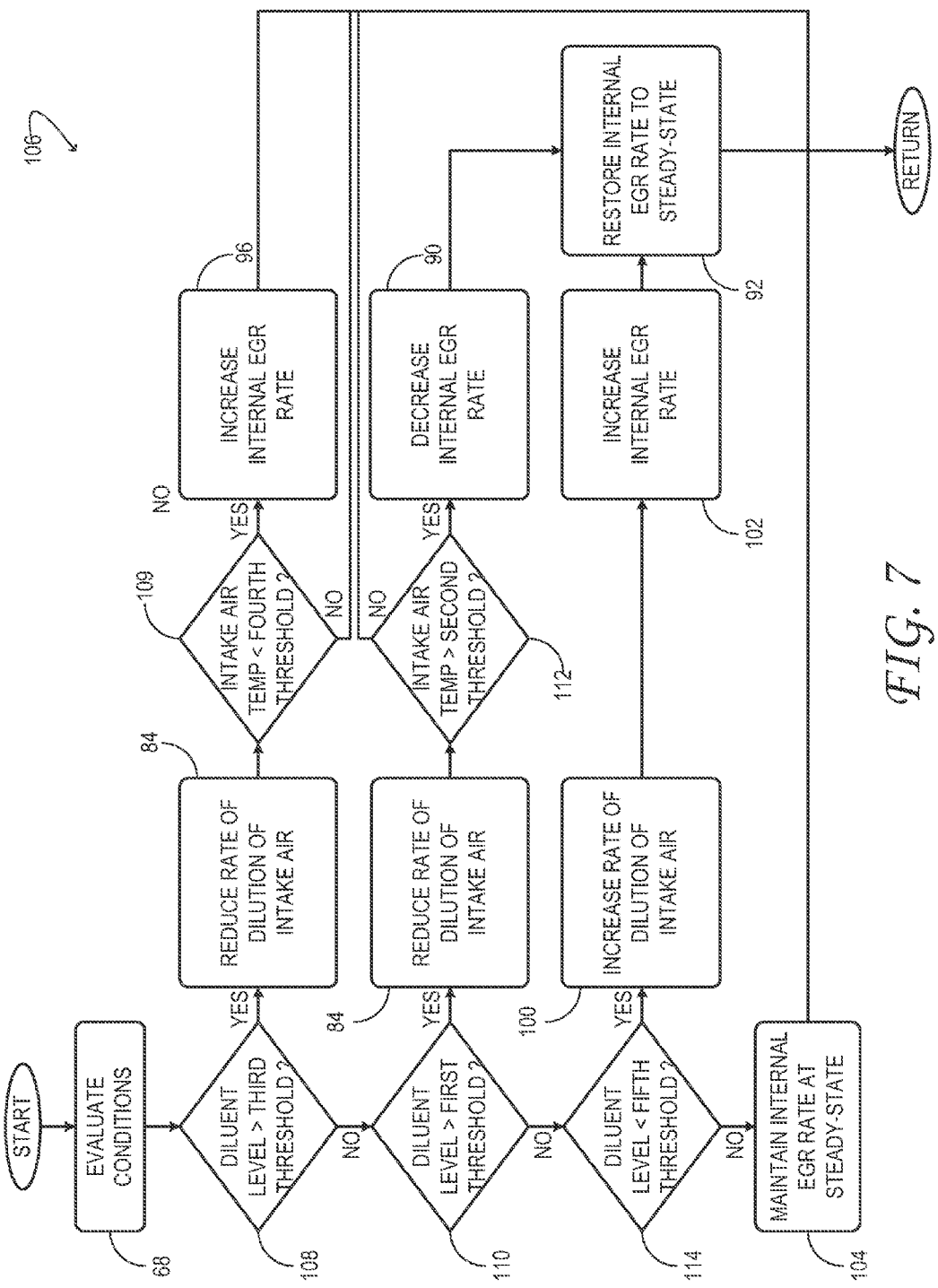
FIG. 7 illustrates another example method for controlling combustion in a cylinder of a turbocharged engine in accordance with an embodiment of this disclosure.

FIG. 7 illustrates another example method 106 for controlling combustion in a cylinder of a boosted engine. In this method, relative amounts of diluent in the intake air (i.e., diluent or dilution levels) are compared to a series of thresholds—viz., first, third, and fifth diluent-level thresholds. Further, the intake-air temperature is compared to second and fifth temperature thresholds. It will be understood, however, that such thresholds need not be fixed thresholds, but may themselves be functions of various operating parameters of the engine system, as further described below.

The method begins at 68, where the various operating conditions of the engine system are evaluated. From 68, the method advances to 108, where it is determined whether the level of diluent in the intake air is above a third threshold. To this end, the diluent level may be determined as described above, in the context of method 68A. In one embodiment, the third threshold may correspond to a maximum allowable level of air-charge dilution. Accordingly, the third threshold may decrease with decreasing engine speed or load. In another embodiment, the third threshold may decrease with increasing relative humidity. In another embodiment, the third threshold may increase with increasing barometric pressure. If the diluent level is above the third threshold, then the method advances to 84, where the rate of dilution of the intake air is reduced. The method then advances to 109, where it is determined whether the intake-air temperature is below a fourth threshold. The fourth threshold may be a temperature below which combustion stability may be reliably improved by increasing the air-charge temperature, even with increased air-charge dilution. If the intake-air temperature is below the fourth threshold, then the method advances to 96, where the internal EGR rate is increased, and the method returns.

Returning to 108, if it is determined that the level of the diluent is not above the third threshold, then the method advances to 110, where it is determined whether the level of the diluent is above a first threshold. In one embodiment, the first threshold may be substantially the same as the third threshold. In another embodiment, the first threshold may be different, but may respond like the third threshold to changing engine-system conditions. For example, the third threshold may decrease with decreasing engine speed or load, decrease with increasing relative humidity, increase with increasing barometric pressure, etc.

If the level of the diluent is above the first threshold, then the method advances to 84, where the rate of dilution of the intake air is reduced. The method then advances to 112, where it is determined whether the intake-air temperature is above a second threshold. The second threshold may be a temperature above which a further increase in air-charge temperature may not effect an improvement in combustion stability if accompanied by an increase in air-charge dilution. Above this threshold, combustion stability may be more reliably improved by decreasing the air-charge dilution. Accordingly, if the intake-air temperature is above the second threshold, then the method advances to 90, where the internal EGR rate is decreased. The method then advances to 92, where the internal EGR rate is restored to the steady-state value, and the method returns.

Returning to 110, if it is determined that the level of the diluent is not above the first threshold, then the method advances to 114, where it is determined whether the level of the diluent is below a fifth threshold. In one embodiment, the fifth threshold may correspond to a minimum allowable level of air-charge dilution. Accordingly, the fifth threshold may increase with increasing engine speed or load. If the level of the diluent is below the fifth threshold, then the method advances to 100, where the rate of dilution of the intake air is increased. The method then advances to 102, where the internal EGR rate is increased. From 102, the method returns to 92, where the internal EGR rate is restored to the steady-state value, and the method returns.

Returning to 114, if it is determined that the level of the diluent is not below the fifth threshold, then the method advances to 104, where the internal EGR rate is maintained at the steady-state value, and the method returns.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A method for controlling combustion in a cylinder of a boosted engine in which intake air is reserved upstream of the cylinder, the method comprising:
   decreasing an internal EGR rate in the cylinder during a tip-out condition if the temperature of the intake air is above a threshold; and
   increasing the internal EGR rate in the cylinder during a tip-out condition if the temperature of the intake air is below the threshold.

2. The method of claim 1 further comprising reducing a rate of dilution of intake air reserved upstream of the cylinder during the tip-out condition.

3. The method of claim 2 further comprising maintaining a steady-state internal EGR rate in the cylinder prior to the tip-out condition.

4. The method of claim 3 further comprising:
   after decreasing the internal EGR rate in the cylinder during the tip-out condition, restoring the internal EGR rate to the steady-state rate commensurate with a decreasing dilution of the intake air caused by reducing the rate of dilution of the intake air.

5. The method of claim 4 wherein the steady-state internal EGR rate is maintained at a higher level if the temperature of the intake air is above the threshold, and at a lower level if the temperature of the intake air is below the threshold.

6. The method of claim 3 wherein the steady-state internal EGR rate supplies a greater fraction of the total rate of diluent delivery to the cylinder if the engine is operating in a first load-speed region, and a lesser fraction of the total rate of diluent delivery to the cylinder if the engine is operating in a second load-speed region of greater load or speed than the first.

7. The method of claim 1 further comprising increasing the internal EGR rate in the cylinder and increasing a rate of dilution of intake air reserved upstream of the cylinder during a tip-in condition.

8. The method of claim 1 wherein decreasing and increasing the internal EGR rate comprises altering a variable cam phasing applied to one or more of an intake valve and an exhaust valve of the cylinder.

9. A method for controlling combustion in a cylinder of a boosted engine in which intake air is reserved upstream of the cylinder, the method comprising:
   decreasing an internal EGR rate in the cylinder if a relative amount of diluent in the intake air is above a first threshold and the temperature of the intake air is above a second threshold; and
   increasing the internal EGR rate in the cylinder if the relative amount of the diluent is above a third threshold and the temperature of the intake air is below a fourth threshold.

10. The method of claim 9 further comprising cooling the diluent reserved upstream of the cylinder by flowing the diluent through a heat exchanger.

11. The method of claim 9 wherein the diluent comprises an exhaust of the boosted engine drawn from downstream of an exhaust turbine and combined with the intake air upstream of a compressor.

12. The method of claim 9 wherein the temperature of the intake air is an intake-manifold air temperature.

13. The method of claim 9 wherein the temperature of the intake air is inferred based on one or more of an ambient air temperature and an engine-coolant temperature.

14. The method of claim 9 wherein the first and third thresholds decrease with decreasing engine speed or load.

15. The method of claim 9 wherein the first and third thresholds decrease with increasing relative humidity.

16. The method of claim 9 wherein the first and third thresholds increase with increasing barometric pressure.

17. The method of claim 9 further comprising increasing the internal EGR rate in the cylinder if the relative amount of diluent is below a fifth threshold.

18. The method of claim 17 wherein the fifth threshold increases with increasing engine speed or load.

19. The method of claim 9 wherein decreasing and increasing the internal EGR rate comprises altering a variable cam phasing applied to one or both of an intake valve and an exhaust valve of the cylinder.

20. A method for controlling combustion in a cylinder of a boosted engine in which intake air is reserved upstream of the cylinder, the method comprising:
   detecting a tip-out condition of the boosted engine;
   measuring a temperature of the intake air;
   decreasing an internal EGR rate in the cylinder during the detected tip-out condition if a relative amount of diluent in the intake air is above a first threshold and the measured temperature of the intake air is above a second threshold; and
   increasing the internal EGR rate in the cylinder during the detected tip-out condition if the relative amount of the diluent is above a third threshold and the measured temperature of the intake air is below a fourth threshold.

* * * * *